Sept. 15, 1936.  T. B. TYLER  2,054,574
CONTROL MEANS
Filed June 8, 1932  2 Sheets-Sheet 1

INVENTOR
Tracy Brooks Tyler
BY
ATTORNEYS

Sept. 15, 1936.  T. B. TYLER  2,054,574
CONTROL MEANS
Filed June 8, 1932  2 Sheets-Sheet 2
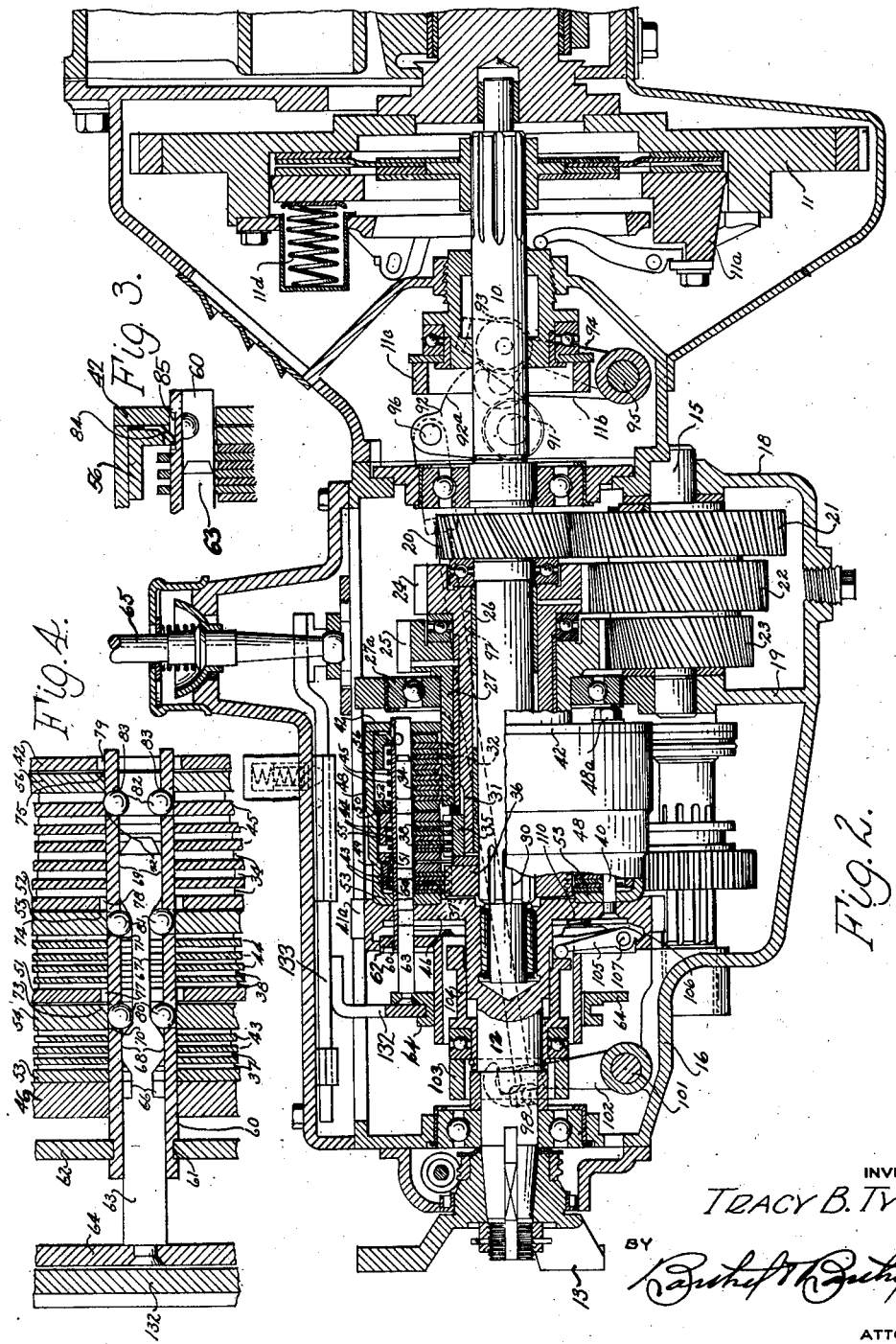
INVENTOR
TRACY B. TYLER
BY
ATTORNEYS Patented Sept. 15, 1936

2,054,574

UNITED STATES PATENT OFFICE 2,054,574

CONTROL MEANS

Tracy Brooks Tyler, Detroit, Mich., assignor to The Monopower Corporation, Detroit, Mich., a corporation of Michigan Application June 8, 1932, Serial No. 616,143

2 Claims. (Cl. 192—99)

This invention relates to transmission and clutch control means, particularly useful with a master clutch and a transmission employing pressure clutches for connecting the torque change parts to the driven part.

The invention aims to provide means, useful in conjunction with the transmission of my copending application Serial No. 614,349, filed May 31, 1932, for operatively connecting the master clutch actuator to the transmission clutch actuator whereby the master clutch actuator will automatically actuate the transmission clutch actuator.

In the application, the transmission contains a group of clutches, any one of which may be selected for engagement, and also contains a cross shaft provided with arms operable to cause engagement of a preselected clutch, and to cause disengagement of a previously engaged clutch. The cross shaft may be rotated by any means, and it is the purpose of this application to provide, for said cross shaft, means connected to the means for operating the master clutch, for reasons to be described.

A further object is to provide, in combination with a multi-clutch transmission and a master clutch, a single means for controlling the transmission clutches and the master clutch.

A further object of the invention is to provide, in a multi-clutch transmission, means whereby the clutches thereof, are so connected to the master clutch that when the master clutch is disengaged the clutches of the transmission will also be disengaged. Accordingly when the vehicle is coasting with master clutch disengaged, the clutches and other parts of the transmission are not being revolved by the propeller shaft, and since these parts are also free of the engine shaft, because of the master clutch being disengaged, this feature permits the transmission to be silent and idle while the vehicle is coasting with the master clutch disengaged.

A still further object is to provide a selective clutch type transmission wherein a selected clutch may be caused to be engaged, by actuator means interlocked or connected to the actuator means for the master clutch, the connection being such that (a) movement of the master clutch actuator towards its clutch disengaged position will automatically disengage the transmission clutches, so that any one of them may be selected by the operator; and (b) movement of the master clutch actuator from its clutch disengaged position towards its clutch engaged position will cause engagement of the preselected clutch of the transmission.

Further, the connection is such that the means for opposing master clutch disengagement will not continuously react against the foot of the operator of the vehicle while he is causing and maintaining disengagement of the transmission clutches.

A still further object is a transmission so constructed that engagement of the transmission clutches cannot be effected until and unless the master clutch actuator is moved from engaged position towards disengaged position. In this manner, accidental engagement of the transmission clutches by accidental movements of the transmission clutch manipulator, is made impossible.

Still further objects of the invention will become readily apparent upon reference to the following detailed description and to the appended drawings in which Figure 1 shows an embodiment of the invention;

Fig. 2 is a longitudinal cross section of a transmission with the present invention associated therewith;

Fig. 3 is a fragmentary cross section, and

Fig. 4 is a view of a detail.

Figure 1:
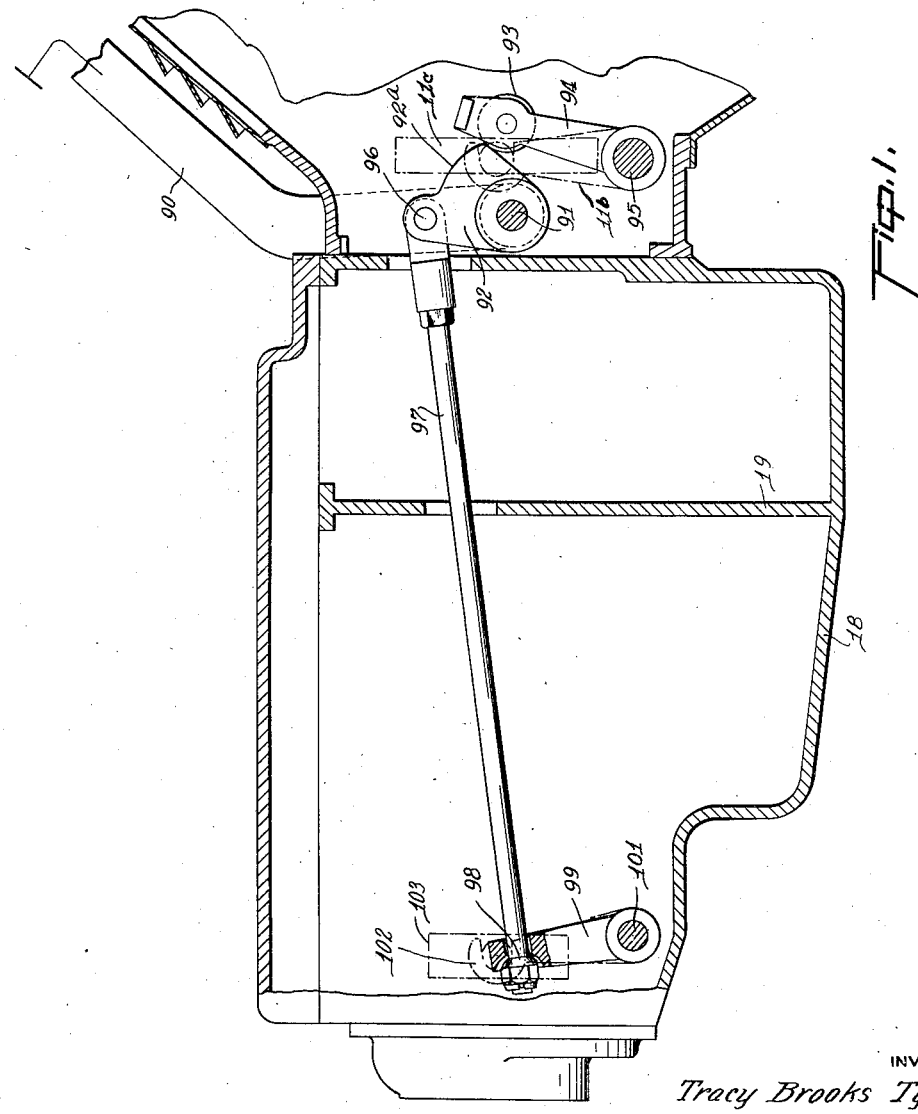

With reference to Figs. 2 and 3, the type of transmission with which the present invention has special utility will be described, it being understood that this transmission forms the subject matter of the above referred to co-pending application and that it is shown by way of example only.

In the drawings the numeral 10 designates a driving shaft that is adapted to be connected to an engine of a vehicle by a master clutch, the latter being of conventional construction and including a driving plate 11 and a reciprocable pressure plate 11a. For reciprocating the pressure plate 11a in one direction there is provided a pivoted clutch throwout fork 11b connected to a clutch throwout bearing 11c and for reciprocating it in the other direction there are provided springs 11d.

A driven shaft 12 is journalled in a transmission casing 18 and has a coupling 13 providing means for connecting the same to a member such as the propellor shaft of a vehicle. A countershaft 15 has one end fixed in the casing 18 and its opposite end fixed in a transverse partition 19. Formed integral with the driving shaft 10 is a gear 20 in constant mesh with a gear 21 on the countershaft 15, the latter also having gears 22 and 23 of different sizes constantly meshing with gears 24 and 25, also of different sizes. The gears 24 and 25 have relatively telescoping sleeves 26 and 27 journalled in a bearing 27a in the partition 19. The shaft 10 and the sleeves 26 and 27 are provided with external splines 30, 31 and 32 respectively for purposes to be described.

Surrounding sleeve 27 are a plurality of separated annular friction disks 34 which have teeth engaging the splines 32 of sleeve 27, the disks being non-rotatably and slidably secured to the sleeve 27. Surrounding sleeve 26 and shaft 10, and splined thereto, are collars 35 and 36, the collars also having external splines by means of which sets of friction plates 37 and 38 are splined thereto, and the three sets of plates 34, 37 and 38 form the driving plates of friction clutches whose driven parts will now be described.

Forming a constellation around the axes of shaft 10 and sleeves 26 and 27 are a plurality of equally spaced rods, one of which is shown at 40, supported in the web 46 of a gear 41a, the web being formed integral with the driven shaft 12, and in a plate 42 surrounding and clear of the outer sleeve 27. Floating on the rods 40 and connecting all of them are sets of annular friction plates 43, 44 and 45 which are nested in sets with the sets of plates 37, 38 and 34 respectively as shown. The plates 43, 44 and 45 loosely surround collars 36 and 35, and sleeve 27 respectively, and are free to be moved or compressed into driving engagement with the driving plates.

The plate 42 is splined to and forms an end plate for a large cylindrical drum 48 riveted to the web 46 by the ends of the rods 40, the rods having nuts 48a on their ends for holding the plate 42 securely to the drum. The drum is stepped, as shown, to provide shoulders at 49 and 50 for backing plates 51 and 52, these, together with the closed end 53 of the drum, forming abutments for the sets of plates 34, 38 and 37 respectively. The drum further contains dished pressure plates 54, 55 and 56, movable by means to be described, towards the backing plates to cause the sets of friction plates to be clamped between them for driving engagement.

The means for moving the pressure plates towards the backing plates in order to cause one or another of the clutch plate sets to be clamped includes a constellation of channel shaped elongated members 60. As seen in Fig. 4 the channels pass through the web 46, the partially closed end 53 of the drum 48, the sets of plates 43, 44 and 45 and the pressure plates 54, 55 and 56, the backing plates 51 and 52 and end plate 42. At one end they are secured by a tongue and groove joint 61 to a clutch main pressure plate 62, and are free at their other ends as shown. Within each channel is slidably disposed an elongated selector 63, the latter having one end secured to a ring 64 operatively connected to a shift lever 65 by means of a fork 132 and sliding element 133.

Each selector is provided with suitably spaced and dimensioned cut-outs or depressions 66 and 67, and suitably spaced and dimensioned pairs of wide portions 68 and 69. Each channel is provided with suitably spaced pairs of holes 70, 71 and 72, located substantially as shown in Fig. 4 and adjacent chamfers 73, 74 and 75 on the edges of the pressure plate apertures through which the channels pass, and are also adjacent reliefs 77, 78 and 79 in the holes of plates 51, 52 and 42. In the pairs of holes are pairs of balls 80, 81 and 82. Further between pressure plate 56 and end plate 42 are substantially L-shaped rocker fingers or reactors 84 which have their lower edges seated in recesses 85 of channels 60 as illustrated more clearly in Fig. 3.

As an example of a selecting operation it will be assumed that the lever 65 is moved to cause movement of the selector 63 so that the wide part 69 thereof registers with the balls 82 to force them outwardly against chamfers 75 and into reliefs 79 where they are thus maintained by the wide portions of the selectors. Movement of channels 60 to the left by means to be presently described causes the outwardly held balls 82 to urge pressure plate 56 to the left, in turn causing plates 34 and 45 to be clamped between the pressure plate 56 and locking plate 52 for frictional driving engagement.

In order to move the channels 60 for the above described clutch engagement there is provided a shaft 101, provided with arms 102 yoked to a collar 103 surrounding the shaft 12, adjacent a sleeve 104, to whose end is pivotally connected the ends of three radially extending, spaced, release fingers 105, these having their other ends extending into a groove 106 formed in the rim of the non-slidable gear 41a integral with the shaft 12. The fingers 105, between their ends, are pivotally connected at 107 to a main pressure plate 62 supported on the channels 60. The forward surface of the plate and the rear surface of the web 46 have counterbores receiving coiled compression springs 110, tending to urge plate 62 to the left. The plate 62 is connected to the selector channels 60 at 61 as shown in Fig. 4.

It will be seen that when shaft 101 is rotated clockwise (Fig. 2) the channels 60 are moved to the right, to release the pressure on clutches and also register the selector balls with the reliefs and chamfers in the plates when in their free position.

Referring more particularly to Fig. 1, it will be seen that there is provided, in front of the transmission casing 18, a master clutch pedal 90 fixed to a cross shaft 91 on which is also fixed a cam 92 adapted to engage the roller end 93 of an arm 94 fixed to a master clutch throwout cross shaft 95, the latter having arm 11b yoked or connected to the master clutch throwout ring 11c as above described. Part of the engaging surface of cam 92 is made concentric with pivot 91 of the cam for reasons to be described.

The cam 92, at 96, is pivotally connected by a link 97, passing through casing partition 19, and having a ball seated nut 98, to an arm 99 fixed to the cross shaft 101, there being a one way lost motion connection between link 97 and arm 99, due to the fact that on clutch engaged position, ball seated nut 98 is spaced from the corresponding seat in arm 99 a slight distance. The cross shaft 101, together with its arms 102 and the transmission clutch control ring 103 control the transmission clutches as above described.

The operation of the device will readily be observed. When pedal 90 is depressed, (or moved to the right), cam 92 is rotated clockwise. This first rotates shaft 95 clockwise, against the influence of the master clutch springs, to cause master clutch disengagement. During the initial part of the movement of pedal 90, shaft 101 is not being rotated, due to the lost motion between link 97 and arm 99. Accordingly, during master clutch disengagement, or during the time the master clutch springs react against the operator's foot through pedal 90, the transmission clutch springs do not so react, for shaft 101 is not then being rotated.

After initial movement of pedal 90 and upon further movement thereof, link 87 picks up arm 99 and causes transmission clutch disengagement, such action being opposed by the transmission clutch springs which then and not until then react against the operator's foot through pedal 90. During this time, the master clutch is held disengaged, without further movement, by the concentric portion 92a of cam 92, which concentric surface now engages roller 93. The master clutch spring, at this time does not react against the operator's foot, since concentric portion 92a of cam 92 locks and holds arm 94 in such a position that the latter reacts against the fixedly mounted shaft 91, without tending to rotate it.

This feature is of importance and because of it, as well as because of the lost motion at 98, only one of the sets of springs is reacting against the operator at any time. Accordingly, there is no greater resistance to pedal movement, or no greater reaction against the operator's foot on the device disclosed, than is the case with conventional master clutch pedals, not connected to a transmission or clutches thereof.

Release of pedal 90 will cause the master clutch and the selected transmission clutch to become engaged, due to the action of the springs provided for them. Due to the lost motion connection and also due to the concentric portion of cam 92, the transmission clutch will engage first, and the master clutch will engage somewhat later. This feature is of importance in constructions where the transmission clutches are of the oil immersed, or not-so-smooth acting type, and where because of that fact, a dry type, smoothly acting master clutch is and must be provided in order to insure smooth starting of the driven element.

In view of the fact that the transmission clutch completely disengages the driving connection, it is not necessary to provide the master clutch with the same degree of movement for disengagement and engagement, that is provided for master clutches now used with conventional transmissions, where the master clutch is and must be moved beyond its complete disengagement position in order to insure complete and certain driving disconnection, and complete and certain operative separation between the driving side of the transmission and the engine, to permit shifting of the transmission parts.

Further it will be seen that the transmission clutches cannot be disengaged and re-engaged accidentally, since their action is controlled by a part, namely pedal 90, which is so mounted that it cannot ordinarily be moved accidentally.

It will also be observed that disengagement of the master clutch for coasting, is automatically accompanied by disengagement of the transmission clutches. Consequently, the transmission is made silent when the vehicle is coasting, without the necessity of shifting the transmission parts to neutral.

Now having described the invention and a preferred embodiment thereof, reference will be had to the following claims which define the scope of the invention;

What I claim is:

1. In a device of the character described, a pair of spaced apart movable elements, a cam engaging one of said elements and adapted to be rotated to cause movement of said element, a link attached to said cam to move lengthwise upon rotation of said cam, said link being slidably associated with the other of said elements, and means on said link for engaging said other element upon movement of said link in one direction to cause movement of said other element, said means permitting movement of said link in the other direction without causing movement of said other element.

2. In a device of the character described, a pair of spaced apart movable elements, a cam engaging one of said elements and adapted to be rotated to cause movement of said element, a link attached to said cam to move lengthwise upon rotation of said cam, said link being slidably associated with the other of said elements, and an adjustable abutment on said link adapted to engage said other element upon movement of said link in one direction to cause movement of said element with said link.

TRACY BROOKS TYLER.